United States Patent [19]
Kearney, II et al.

[11] 3,778,007
[45] Dec. 11, 1973

[54] ROD TELEVISION-GUIDED DRONE TO PERFORM RECONNAISSANCE AND ORDNANCE DELIVERY

[75] Inventors: Stuart D. Kearney, II, Bethesda, Md.; Walter Richardson, Ventura, Calif.

[73] Assignee: The United States of America as represented by the Secretary of the Navy, Washington, D.C.

[22] Filed: May 8, 1972

[21] Appl. No.: 252,931

[52] U.S. Cl.................................. 244/3.14, 244/3.16
[51] Int. Cl. .................................................. F41g 7/10
[58] Field of Search................ 244/3.11, 3.13, 3.14, 244/3.15, 3.16, 3.19

[56] References Cited
UNITED STATES PATENTS

| | | | |
|---|---|---|---|
| 3,169,726 | 2/1965 | Jackson | 244/3.14 |
| 3,415,465 | 12/1968 | Bedford | 244/3.14 |
| 2,649,262 | 8/1953 | Fahrney | 244/3.14 X |
| 3,695,555 | 10/1972 | Chadwick | 244/3.16 X |
| 3,366,346 | 1/1968 | McKnight et al. | 244/3.12 X |

Primary Examiner—Samuel Feinberg
Assistant Examiner—H. J. Tudor
Attorney—R. S. Sciascia et al.

[57] ABSTRACT

A remote observation and destruction system comprises an unmanned flight vehicle guided by a remote operator viewing a television display to perform reconnaissance and the delivery of naval ordnance. A television camera is mounted on the unmanned flight vehicle and the television picture is transmitted to a television monitor in a remote control station. The remote operator controls the flight vehicle on the basis of the information contained in the television picture. A hand held laser aimed at the target by a forward observer can be used to point out concealed targets.

10 Claims, 1 Drawing Figure

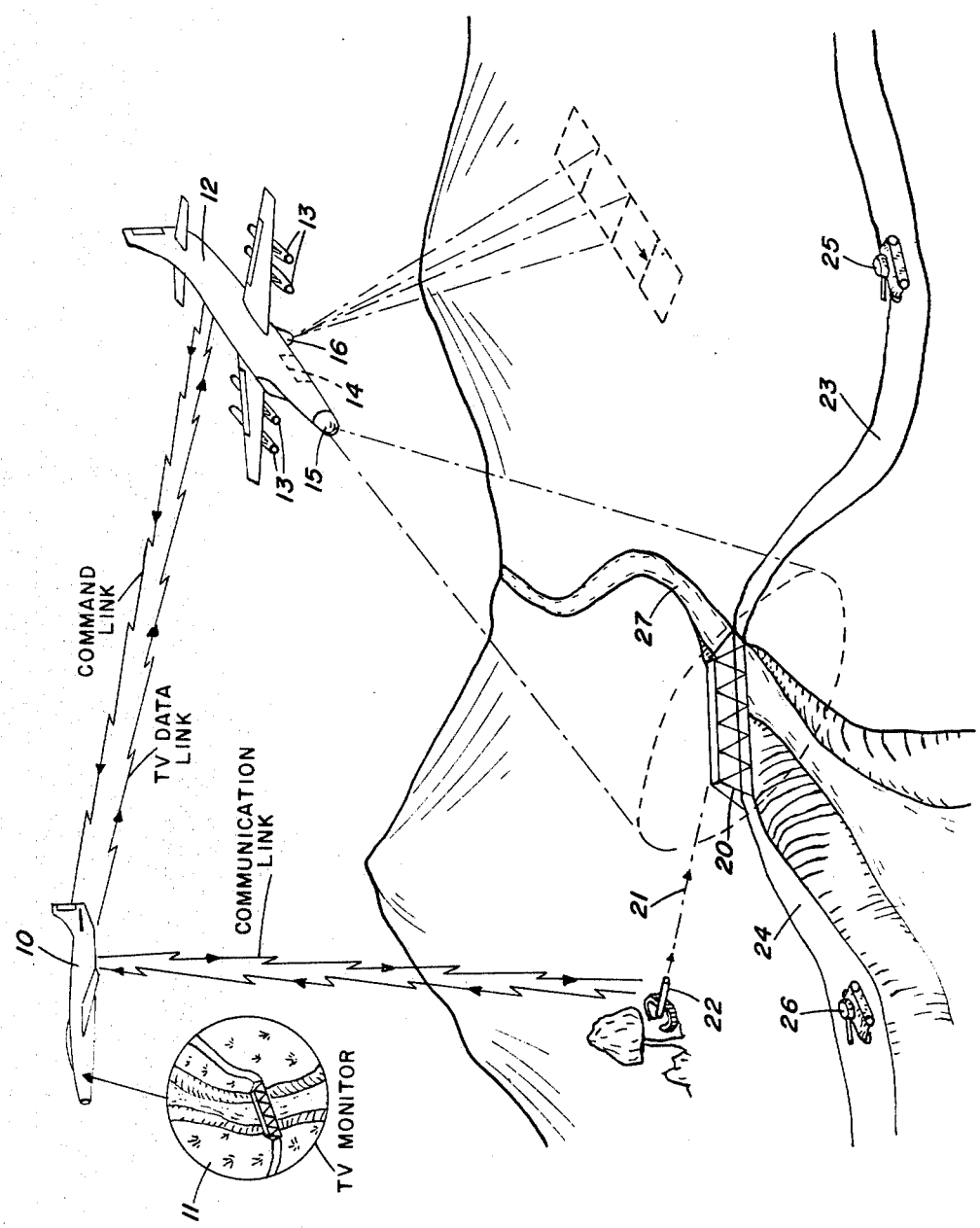

ROD TELEVISION-GUIDED DRONE TO PERFORM RECONNAISSANCE AND ORDNANCE DELIVERY

BACKGROUND OF THE INVENTION

The field of the invention relates generally to a system for guiding an unmanned flight vehicle to a target by a remote operator viewing a TV display and more particularly to a system for guiding an unmanned flight vehicle having a television camera aboard to a concealed target by illuminating the target with a laser beam.

One of the most critical problems associated with either conventional military warfare or guerilla warfare is the achievement of reconnaissance and ordnance delivery in areas where the enemy defenses are severe without unduly heavy losses in terms of personnel and equipment. Conventional guided missiles for ordnance delivery are effective only where the target position is known with some accuracy and the target is stationary. The use of conventional aircraft for reconnaissance or ordnance delivery in severely defended areas results in heavy losses both in personnel and very expensive aircraft. Even aircraft carrying the television controlled CONDOR missile often have to approach the target area to deliver the missile.

SUMMARY OF THE INVENTION

The system of the present invention comprises an unmanned flight vehicle (drone) guided by a remote operator viewing a television display to perform reconnaissance and the delivery of naval ordnance. The flight vehicle is a conventional radio controlled drone, such as the Firebee of Ryan Aeronautical, modified by the addition of a television camera and, if desired, ordnance. In the reconnaissance role the drone offers real-time observation via a TV data link between the drone and a conventional observation station (ground or airborne) for specific area coverage and post-strike surveillance. The drone also provides remote delivery of ordnance (bombs, guided missiles, self-contained warheads) against targets located via the TV monitor. It would be most useful against highly mobile targets such as motor vehicles or troops which require immediate attack and against prebriefed point or area targets where the enemy defenses are severe. If the drones are shot down there is no loss of personnel and the cost of a drone is much less than the cost of a conventional aircraft capable of performing the same mission. If not shot down, the drone can be recovered and used again. The remote observer does not have to approach the target area, as with CONDOR missiles, since the drone can have a range of hundreds of miles.

Final terminal guidance against particularly well concealed targets has always presented a nearly insurmountable problem. By utilizing a forward observer, who illuminates the target with a laser beam, a shuttered image orthicon tube in the drone detects the coherent light which is reflected from the target. The remote operator commands the drone to fly a collision course with the target as designated by the forward observer.

OBJECTS OF THE INVENTION

An object of the present invention is to provide a system for the remote delivery of ordnance and reconnaissance.

Another object of the invention is to provide a system for the remote delivery of ordnance to a concealed target.

A further object of the invention is to provide a means of reconnaissance and ordnance delivery in areas of severe enemy defenses which can be utilized in place of conventional aircraft.

Still another object of the invention is to provide a safe and low cost means of reconnaissance and ordnance delivery in severely defended areas.

Other objects, advantages, and novel features of the present invention will become apparent from the following detailed description of the invention when considered in conjunction with the accompanying drawings.

BRIEF DESCRIPTION OF THE DRAWINGS

The FIGURE shows the complete system in an operational environment.

DESCRIPTION OF THE PREFERRED EMBODIMENTS

Referring to the FIGURE, conventional aircraft 10 serves as the remote observation and control station. Drone 12 can be an expendable aircraft, an off-the-shelf target drone aircraft or a simple airframe powered by an expendable turbine engine. The drone has a shuttered image orthicon TV camera 15 disposed in the nose. The drone may carry a warhead integral with the airframe so that the drone may itself be used as a missile. The drone may carry missiles 13. Particularly useful are laser homing weapons such as a sparrow missile airframe with a four-quadrant silicon cell detector installed as a seeker in the nose. The drone may also carry conventional bombs in bombay 14. A side looking synthetic aperture radar 16 provides location data which may be transmitted via a data link as real time information or may be stored and recorded on return to base recovery area. A TV monitor 11 in control aircraft 10 receives the TV picture from camera 15 via a TV data link and the command signals are transmitted to the drone via a command link. The command and data links may be, for example, a quantized digital data link. A hand held laser 22 emits a laser beam 21 at a target. A forward observer holding the laser is in communication with the control aircraft via a communication link.

The FIGURE shows an operational situation of the type contemplated wherein enemy tank 25 and 26 are traveling along a road. Bridge 20 over river 27 divides the road into portions 23 and 24. Destruction of bridge 20 at this time would separate the two tanks from each other to their disadvantage. The forward observer communicates this information to control aircraft 10 which directs drone 12 toward the bridge using the transmitted picture on TV monitor 11 and/or radar information from radar 16 to guide the drone. When the drone is in visual range of target 20 (shown on TV monitor 11), the forward observer illuminates the target with laser beam 21 from laser 22. The reflected laser beam will appear as a "blossom" on the TV monitor aiding the controller in directing the drone toward the target. If the drone is carrying laser homing missiles 13 they can now be fired and will home in on the reflected laser beam from the bridge. Conventional bombs could be dropped or the controller can direct the drone on a collision course with the bridge. When using the drone as a missile, the nose of the drone itself may contain a laser homing system which is activated by the controller when the reflected laser beam is visible on the TV monitor.

Homing on the reflected laser beam also allows close-up reconnaissance of an area designated by the forward observer. If, for example, the target is a camouflaged area difficult to detect from the air, the forward observer can direct the reconnaissance drone to the area by means of the reflected laser beam. Close-up reconnaissance can thus be achieved even if the area is heavily defended since the drone is expendable and the information is set to the controller via the TV data link. The laser illuminator system herein described is thus effective not only for ordnance delivery but for reconnaissance and target detection as well.

The invention described herein has the following, as well as other, advantages over manned aircraft reconnaissance and ordnance delivery systems: low vulnerability to enemy fire; low risk to personnel since no manned aircraft is involved over the immediate target area; high weapon delivery accuracy (tests show a 5–15 feet CEP); versatility in providing both reconnaissance and delivery functions; low cost; a high degree of reliability achieved by using conventional TV components readily available as off-the-shelf items; no landing field is needed since the drones may be air droppable and recovered by parachute.

Obviously, many modifications and variations of the present invention are possible in light of the above teachings. It is therefore to be understood that, within the scope of the appended claims, the invention may be practiced otherwise than as specifically described.

What is claimed is:

1. A system for remote observation and destruction of a target comprising:
   a drone aircraft;
   a TV camera disposed in the nose of said drone;
   a control station disposed at a location remote from said drone;
   a TV monitor, disposed at said control station,
   TV data link means for transmitting data from said TV camera, and for applying said transmitted data to said TV monitor;
   a laser operated from a position near the target and disposed so that its beam illuminates the target; and
   a command link between said control station and said drone.

2. The system of claim 1 further including a communication link between said control station and said laser.

3. The system of claim 1 wherein at least one missile is disposed aboard the drone aircraft.

4. The system of claim 3 wherein said missile is a laser homing weapon with a four-quadrant silicon cell laser detector disposed in its nose.

5. The system of claim 1 wherein said drone aircraft is an off-the-shelf target drone.

6. The system of claim 1 wherein said drone aircraft is a simple airframe powered by an expendable turbine engine.

7. The system of claim 6 wherein a warhead is disposed integrally with said airframe.

8. The system of claim 1 wherein said drone aircraft carries a side looking synthetic aperture radar.

9. The system of claim 2 wherein the communication link comprises a quantized digital data link.

10. A method of remotely observing and destroying a target by means of a remotely controlled drone aircraft carrying a TV camera and laser homing weapons, comprising:
    guiding the drone aircraft into TV-camera range of the target so that said target may be observed visually at a remote place by means of a signal from said TV camera;
    illuminating the target with a laser beam;
    aiming the drone aircraft at the target as determined by the reflected laser beam; and
    firing said laser homing weapons at said target.

* * * * *